Dec. 22, 1964   E. S. FRIEDLANDER ETAL   3,162,800
ELECTRIC SUPPLY ARRANGEMENTS
Filed Sept. 8, 1961
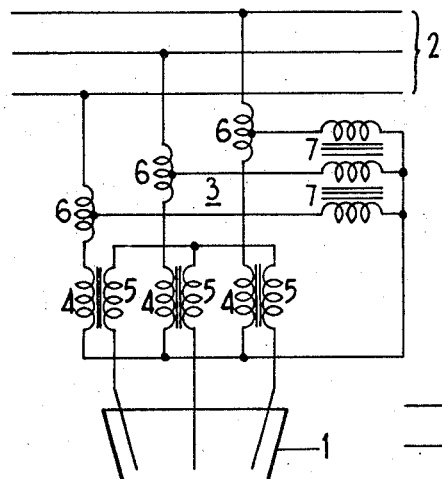
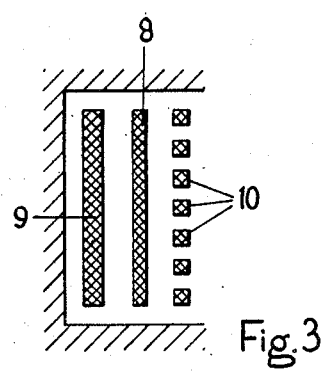
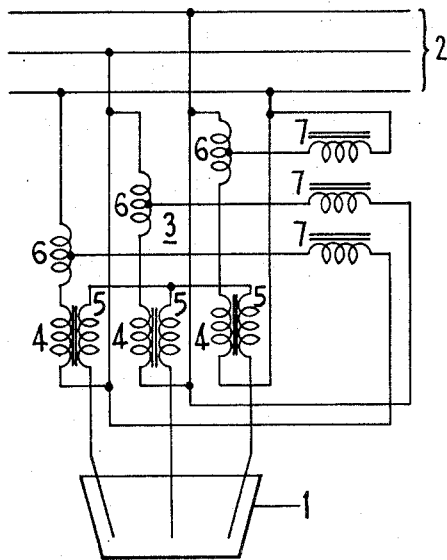
INVENTOR
ERICH SIEGFRIED FRIEDLANDER
KENNETH CHARLES PARTON
BY Kirschstein, Kirschstein & Ottinger
ATTORNEYS

United States Patent Office 3,162,800
Patented Dec. 22, 1964

3,162,800
ELECTRIC SUPPLY ARRANGEMENTS
Erich Siegfried Friedlander, Sutton Coldfield, and Kenneth Charles Parton, Handsworth, England, assignors to The General Electric Company Limited, London, England, a British company
Filed Sept. 8, 1961, Ser. No. 136,906
Claims priority, application Great Britain, Sept. 9, 1960, 31,150/60
5 Claims. (Cl. 323—60)

The present invention relates to electric supply arrangements for use with an electric supply network feeding a fluctuating load.

The invention is especially applicable to means for reducing voltage flicker in, for example, a polyphase supply network feeding a high power electric arc furnace through a transformer and reactors, but in its broadest aspect the invention is applicable to both single phase and polyphase networks.

In principle, load current fluctuations, giving rise to such flicker, can be rapidly absorbed by saturable reactors having a very flat characteristic, but such reactors have to be connected with series capacitors, and possibly buffer reactors also, in order to obtain a sufficiently flat characteristic on the one hand a sufficiently high amplitude of flicker voltage for bringing these reactors into action on the flicker level.

The present invention provides a much simpler arrangement and achieves this by taking advantage of the voltage fluctuations occurring between the flicker level on the network and the load level.

Thus, according to the present invention, voltage regulating apparatus for use with a single phase or a polyphase electric supply network feeding a fluctuating load, and including means for reducing voltage flicker on the network, comprises a supply transformer having a primary winding adapted to be connected to the supply network and a secondary winding adapted to be connected to the load, and a saturable reactor adapted to be coupled to the network and so arranged with respect to the transformer that the voltage across the reactor, and hence the saturation of the reactor, is caused to follow load fluctuations without delay whereby to absorb current fluctuations at the transformer.

Three arrangements in accordance with the invention will now be described, by way of example, with reference to the accompanying drawing, in which FIGURES 1 and 2 are schematic circuit diagrams of two flicker suppression arrangements for small electric arc furnaces, and FIGURES 3 and 4 illustrate details of a modified arrangement suitable for larger electric arc furnaces.

Referring to FIGURE 1, an electric arc furnace 1 is fed from a three phase supply network 2 via a supply transformer 3. The transformer 3 has a star-connected primary winding 4 connected to the network and a secondary winding 5 connected to the electrodes of the furnace 1. In series with each phase of the primary winding 4, between the transformer and the supply network, is an inductive reactor 6 having a tapping. Between the tappings and the star point of the primary winding are connected three star-connected saturable reactor elements 7.

The tapping points on the reactors 6 are chosen so that, in the event of current fluctuation at the transformer 3 arising from arc extinction, a voltage fluctuation across the saturable reactor 7 is obtained and this fluctuation is sufficiently large to cause the reactor to saturate without delay; thus current fluctuations at the transformer are taken over by the saturable reactor.

It will be noted that the arrangement, which is effective to correct at least the most severe voltage fluctuations, is of the simplest kind, the reactors 7 being without secondary windings and series capacitors.

The second arrangement, shown in FIGURE 2, is essentially similar to that shown in FIGURE 1, but the saturable reactor elements 7 are arranged in this case in a primary mesh delta connection.

In the case of very large furnaces, however, the leakage reactance of the furnace transformer is usually so large that external reactors, such as the reactors 6, are not required. In this case it will be necessary to fit a special winding in such a position between the secondary winding and the primary winding of the transformer so that the effect is that which would be obtained if an appreciable portion of the leakage reactance of the transformer were external to the transformer, being equivalent to the reactors 6 of FIGURES 1 and 2.

The practical arrangements of such a special, or intermediate, winding would depend upon the construction of the furnace transformer, and may take various forms.

One such arrangement is shown in FIGURE 3, which shows in detail a section through part of the transformer, the intermediate winding 8 being positioned in the "stray" space between the primary winding 9 and the secondary winding 10, the windings 8 and 9 being disposed to provide as large a leakage reactance as possible. The windings 8 and 10 are preferably interleaved so as to keep the leakage reactance between these windings to a minimum. FIGURE 4 shows the electrical connections for such an arrangement, which for simplicity is assumed to be single phase but may be three phase. Referring to FIGURE 4, the saturable reactor 7 is connected in a closed circuit with the intermediate winding 8 to the supply network, the primary windings 9 being also connected to the supply network 2, and the secondary windings 10 being connected to the furnace electrodes.

One advantage of the arrangements proposed is that the considerable reactance in series with the saturable reactors 7 will prevent the reactor from producing harmonics of excessive amplitude. These harmonics can be expected to be of the order of magnitude of the harmonics produced by the furnace itself.

On the other hand, there may be some advantage in using isotropic steel as this will permit the saturable reactors to be connected further away from the furnace so that they may in this case interfere less with the stability of the arc.

In certain applications, the saturable reactors may themselves increase the probability of arc extinction. This risk can be minimised by superimposing upon the mains frequency supply a high frequency oscillation to provide the re-ignition voltage required at any time in a similar manner to that adopted for certain methods of arc welding.

Although the invention has been described with particular reference to arc furnaces, it will be appreciated that it is also applicable to arc welding equipment.

We claim:

1. In an electric supply arrangement in which a load circuit including a fluctuating load is fed from an electric supply network; means for reducing voltage flicker on the supply network arising from load fluctuations, said means comprising:

(a) a shunt circuit essentially comprising saturable reactor means, and means connecting the reactor means in parallel with the load circuit, (b) inductor means, said inductor means constituting a first inductor section and a second inductor section, (c) circuit means connecting the saturable reactor means of said shunt circuit to the supply network through said first inductor section, and (d) circuit means connecting the load circuit to the supply network through at least said second inductor section, the relationship between the first and second inductor sections being such as to cause voltage variations across the saturable reactor means to follow load current variations without delay for causing said load current variations to be absorbed by the reactor means.

2. In an electric supply arrangement in which a load circuit including a fluctuating load is fed from an electric supply network; means for reducing voltage flicker on the supply network arising from load fluctuations, said means comprising:

(a) a shunt circuit essentially comprising saturable reactor means, and means connecting the reactor means in parallel with the load circuit, (b) inductor means, (c) circuit means connecting the said inductor means in series with said load circuit, (d) said inductor means constituting a first inductor section, a second inductor section and a tapping between said sections, (e) circuit means connecting the saturable reactor means of said shunt circuit to said tapping so that it is connected to the supply network through said first inductor section, and (f) means connecting said load circuit to the supply network through said second inductor section, the relationship between the first and second inductor sections being such as to cause voltage variations across the saturable reactor means to follow load current variations without delay for causing said load current variations to be absorbed by the reactor means.

3. In an electric supply arrangement in which a load circuit including a fluctuating load is fed from an electric supply network; means for reducing voltage flicker on the supply network arising from load fluctuations, said means comprising:

(a) a supply transformer having a primary winding and a secondary winding, (b) circuit means connecting said primary winding to the supply network, (c) circuit means connecting said secondary winding to the load, (d) a shunt circuit essentially comprising saturable reactor means, and means connecting the reactor means in parallel with said primary winding, (e) inductor means, (f) circuit means connecting said inductor means in series with said primary winding, (g) said inductor means comprising a first inductor section, a second inductor section, and a tapping between said sections, (h) circuit means connecting the saturable reactor means of said shunt circuit to said tapping so that it is connected to the supply network through said first inducator section, and (i) means connecting said load circuit to the supply network through said second inductor section, the relationship between the first and second inductor sections being such as to cause voltage variations across the saturable reactor means to follow load current variations without delay for causing said load current variations to be absorbed by the reactor means.

4. In an electric supply arrangement in which a load circuit including a fluctuating load is fed from an electric supply network; means for reducing voltage flicker on the supply network arising from load fluctuations, said means comprising:

(a) a supply transformer having a substantial leakage reactance, (b) said supply transformer having a primary winding, a secondary winding and an auxiliary winding tightly coupled to said secondary winding, (c) circuit means connecting said primary winding to the supply network, (d) circuit means connecting said secondary winding to the load, and (e) a shunt circuit essentially comprising saturable reactor means, means connecting the saturable reactor means in series with said auxiliary winding, and means connecting said series connected saturable reactor means and auxiliary winding in parallel with said primary transformer winding, the relationship between the secondary winding and the auxiliary winding being such as to cause voltage variations across the saturable reactor means to follow load current variations without delay for causing said load current variations to be absorbed by the reactor means.

5. In an electric supply arrangement in which a load circuit including a fluctuating load is fed from an electric supply network; means for reducing voltage flicker on the supply network arising from load fluctuations, said means comprising:

(a) a capacitor-free shunt circuit incorporating saturable reactor means, and means connecting the reactor means in parallel with the load circuit, (b) inductor means, said inductor means constituting a first inductor section and a second inductor section, (c) circuit means connecting the saturable reactor means of said shunt circuit to the supply network through said first inductor section, and (d) circuit means connecting the load circuit to the supply network through at least said second inductor section, the relationship between the first and second inductor sections being such as to cause voltage variations across the saturable reactor means to follow load current variations without delay for causing said load current variations to be absorbed by the reactor means.

References Cited by the Examiner

UNITED STATES PATENTS

| | | | |
|---|---|---|---|
| 2,442,214 | 5/48 | Short | 323—61 |
| 2,444,794 | 7/48 | Uttal et al. | 323—61 |
| 2,967,271 | 1/61 | Kohn | 323—60 |

LLOYD McCOLLUM, *Primary Examiner.*

MILTON O. HIRSHFIELD, *Examiner.*